United States Patent [19]

Klein et al.

[11] Patent Number: 4,472,059
[45] Date of Patent: Sep. 18, 1984

[54] REDUCED WEAR PLASTICATING EXTRUDER SCREW CONVEYORS

[75] Inventors: Reuben Klein; Imrich Klein, both of Highland Park, N.J.

[73] Assignee: Scientific Process & Research, Inc., Somerset, N.J.

[21] Appl. No.: 425,929

[22] Filed: Sep. 28, 1982

[51] Int. Cl.³ ............................ B01F 7/08; B28B 1/06
[52] U.S. Cl. ........................................ 366/79; 366/91; 366/99; 366/293
[58] Field of Search ........................ 366/75, 76, 77, 79, 366/81, 83, 84, 88, 89, 90, 91, 97, 98, 99, 293, 294, 295, 318, 319

[56] References Cited

U.S. PATENT DOCUMENTS

| | | | |
|---|---|---|---|
| 3,375,549 | 4/1968 | Geyer | 366/83 |
| 3,866,890 | 2/1975 | Tadmor | 366/76 |
| 3,867,079 | 2/1975 | Kim | 366/76 |
| 3,924,842 | 12/1975 | Klein | 366/79 |
| 4,290,702 | 9/1981 | Klein | 366/77 |
| 4,387,997 | 6/1983 | Klein | 366/79 |

OTHER PUBLICATIONS

"The Solids Draining Screw: A New Twist for Extrusion" *Plastic Engineering,* Oct. 1979.

*Primary Examiner*—Robert W. Jenkins
*Assistant Examiner*—Arthur D. Dahlberg
*Attorney, Agent, or Firm*—Samuelson & Jacob

[57] ABSTRACT

A plasticating extruder screw conveyor includes multiple primary flights and corresponding multiple secondary flights defining multiple channels on the screw conveyor arranged about the longitudinal axis of the screw conveyor such that radial components of forces between the screw conveyor and unplasticated material located in the channels are substantially balanced so as to reduce to a minimum any resultant radial force upon the screw conveyor and any concomitant lateral deflection of the screw conveyor, thereby reducing or eliminating excessive vibration, wear or galling of the screw conveyor.

12 Claims, 4 Drawing Figures

REDUCED WEAR PLASTICATING EXTRUDER SCREW CONVEYORS

The present invention relates generally to plasticating extruders and pertains, more specifically, to screw conveyors which attain improvements in the melting of solids introduced into plasticating extruders employing such screw conveyors.

In the U.S. Pat. No. 3,924,842, there is disclosed plasticating apparatus in which the screw conveyor includes an internal passage which communicates with the external main channel of the screw conveyor at locations enabling unmelted solids to enter the passage at a downstream location and proceed upstream to be melted and reintroduced into the main channel at an upstream location, thereby facilitating the entire plasticating operation.

In our earlier patent, U.S. Pat. No. 4,290,702, we disclosed a screw conveyor having a primary flight, an internal backfeed passage and a secondary flight located on the screw conveyor and associated with the primary flight for segregating and directing unplasticated material into the backfeed passage.

We have observed that the presence of a secondary flight on a scew conveyor which includes a similar arrangement of primary and secondary flights results in the establishment of forces exerted upon the screw conveyor in lateral directions. Radial components of these forces will deflect the screw conveyor laterally. When these radial component forces are of a great enough magnitude, sufficient deflection will occur to cause excessive vibration, wear, and even galling of the screw conveyor as the screw conveyor rotates within the extruder. Thus, if the radial component force can be minimized, or even eliminated, lateral deflection of the screw conveyor can be reduced with a concomitant reduction in vibration, wear or galling.

An object of the present invention is to provide an improvement in a screw conveyor structure of the type which employs a secondary flight in conjunction with a primary flight for the segregation of unplasticated material.

Another object of the invention is to provide a screw conveyor construction in which a secondary, solids-directing flight is employed in conjunction with the primary, main flight and an internal backfeed passage to direct unplasticated material into the backfeed passage and to segregate the already-plasticated material from the unplasticated material in the main channel, for more effective melting and in which lateral deflections of the screw conveyor are minimized so as to reduce to a minimum any vibration, wear or galling which could occur as a result of excessive lateral deflection.

Still another object of the invention is to provide a screw conveyor of the type employing a secondary flight in conjunction with a primary flight for the segregation of unplasticated material, and in which lateral deflections of the screw conveyor are minimized so as to reduce to a minimum any vibration, wear or galling which could occur as a result of excessive lateral deflection.

A further object of the invention is to provide a screw conveyor of the type described and which is compatible for use in current extrusion apparatus.

The above objects, as well as further objects and advantages, are attained by the present invention which may be described briefly as apparatus for use in a plasticating extruder of the type having a longitudinally extending elongate barrel for preparing a plasticated material from solids introduced into the extruderr, said apparatus comprising: a screw conveyor for placement in the barrel, the screw conveyor including a longitudinal axis and at least two primary flights, each primary flight defining a channel for continuously conveying the material in a downstream direction as the material is melted within the channel, each primary flight having a leading face facing downstream and a trailing face facing upstream, each channel extending between the leading face and the trailing face of a corresponding flight; at least two secondary flights on the screw conveyor each secondary flight being associated with one of the primary flights for directing unplasticated material into the backfeed passage and segregating the already plasticated material from unplasticated material in the corresponding channel; the primary flights and the secondary flights being located about the longitudinal axis of the screw conveyor such that radial components of forces between the screw conveyor and the unplasticated material located in each channel between each primary flight and the corresponding secondary flight will substantially be balanced so as to reduce to a minimum any resultant radial force upon the screw conveyor and any concomitant lateral deflection of the screw conveyor.

The invention will be more fully understood, while still further objects and advantages will become apparent, in the following detailed description of preferred embodiments illustrated in the accompanying drawing, in which.

Figure 1:
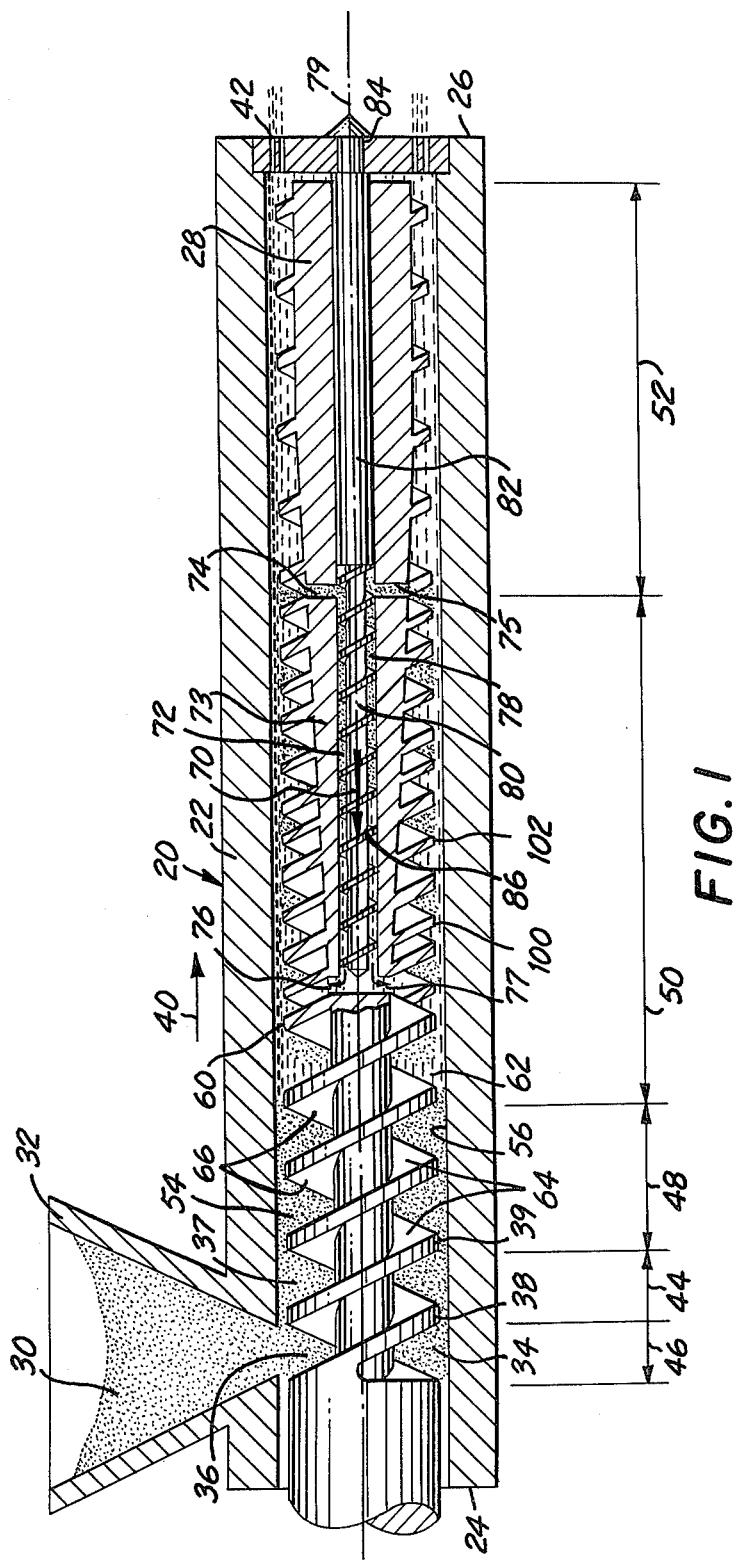
FIG. 1 is a somewhat schematic representation of a plasticating extruder illustrating a screw conveyor constructed in accordance with the invention.

Referring now to the drawing, and especially to FIG. 1 thereof, a plasticating extruder constructed in accordance with the invention is illustrated somewhat schematically at 20. Extruder 20 includes a barrel 22, extending axially between an upstream end 24 and a dowstream end 26, and a screw conveyor 28 in the barrel. A reservoir of solid material 30 is held in hopper 32 which communicates with the inner chamber 34 of the barrel 22 adjacent the upstream end 24 and feeds the solid material 30 into the channels 36 and 37 defined by helical flights 38 and 39 on the screw conveyor 28. Rotation of the screw conveyor 28 within the barrel 22 will advance the material 30 along the channels 36 and 37 in a downstream direction 40 until the material is delivered, in melted form, to a discharge point 42 at the downstream end 26 of the barrel.

Extruder 20 is divided into functional zones; namely, a solids conveying zone 44, a hopper zone 46, a delay zone 48, a melting zone 50, and a melt conveying zone 52. The solids are compacted into a solid bed 54 in each channel 36 and 37 and, where the inner surface 56 of the barrel 22 reaches the melting point of material 30, the resulting melt forms a continuous film 60.

In the melting zone 50, a melt pool 62 begins to form, cross-channel between the leading face 64 of each flight 38 and 39, which faces downstream, and the confronting trailing face 66 of each flight 38 and 39, which faces upstream. Each melt pool 62 is juxtaposed with the leading face 64 of corresponding flight 38 and 39 and gradually replaces the progressively melting solid bed 54 along the melting zone 50. The melt film 60 is continuously fed from each solid bed 54 and, as the volume of the solid bed decreases, and the volume of the melt increases, the melt spills into the low shear melt pool 62, all as explained in the above cited U.S. Pat. No. 3,924,842.

Extruder 20 has a backfeed passage 72 extending through the interior of the arbor 73 of screw conveyor 28. Passage 72 communicates with both channels 36 and 37 at corresponding downstream locations at openings 74 and 75 and at upstream locations at openings 76 and 77. Openings 74 and 75 are drainage openings for unmelted solids and are positioned with respect to channels 36 and 37 such that unmelted solids will enter the passage 72 and will travel in an upstream direction 70. The openings 76 and 77 are melt-return apertures and are positioned with respect to channels 36 and 37 such that the drained material 78 passing through the passage 72 will be reintroduced into the channels upstream of any potential blockage. Openings 74 and 75 are located adjacent to and preferably immediately behind corresponding trailing face 66 of flights 38 and 39 to assure that unmelted solids will pass through openings 74 and 75. Openings 76 and 77 are located adjacent to and preferably immediately ahead of leading face 64 of each flight 38 and 39 so that the drained material 78 which passes through passage 72 re-enters channels 36 and 37 at a location where there is likely to be melted material. At least part of the drained material 78 ordinarily will be melted as it travels along passage 72 so that the drained material will be reintroduced into channels 36 and 37 in at least partially melted form. Thus, melting efficiency is increased and the quality of the extrudate is enhanced. The passage 72 preferably extends along the central longitudinal axis 79 of the screw conveyor 28 and each opening 74, 75, 76 and 77 extends laterally through the screw conveyor 28, in a radial direction, from the channels 36 and 37 to the interior passage 72.

In order to facilitate movement of the drained material 78 in the upstream direction and thereby attain the desired effectiveness of interior passage 72, a second or inner screw conveyor is inserted into passage 72, as shown at 80. Inner screw conveyor 80 extends axially along interior passage 72 and has an arbor 82 which is affixed to barrel 22 at 84. A flight 86 extends along the length of the inner screw conveyor 80 within the passage 72. Since the inner screw conveyor 80 is fixed to the barrel 22, it remains stationary relative to the rotating outer screw conveyor 28. Hence, flight 86 is "flighted" in the same direction as flight 38 of screw conveyor 28; that is, the helix followed by flight 86 extends in the same direction as the helix of flight 38. In this manner, flight 86 exerts a force upon the drained material 78 in the upstream direction 70 from opening 74 toward opening 76.

Experience has demonstrated that the separation of solids from melt, with the recirculation or recycling of the separated solids, has resulted in a decrease in the amount of energy required to achieve complete plastication while realizing improved throughput quality in the extrudate. As set forth in greater detail in our article titled "THE SOLIDS-DRAINING SCREW: A NEW TWIST FOR EXTRUSION", published in the October 1979 issue of Plastics Engineering, the separation of already-melted plastic from unmelted solids results in increased efficiency and higher quality extrudate. In order to accomplish more effective separation of the unmelted solids from the already plasticated material, and then enable plastication of the separated solids, secondary flights 100 and 101 are placed on the screw conveyor 28 and are arranged so as to segregate and then funnel the unmelted solids into the drainage openings 74 and 75 while, at the same time, diverting unmelted solids away from the melt-return openings 76 and 77 so as to enable unobstructed return of melted material into the backfeed passage 72 to establish an extended flow circuit for the separated solids, and the unplasticated material is segregated from the already plasticated material which need not flow through the extended flow circuit.

Figure 2:
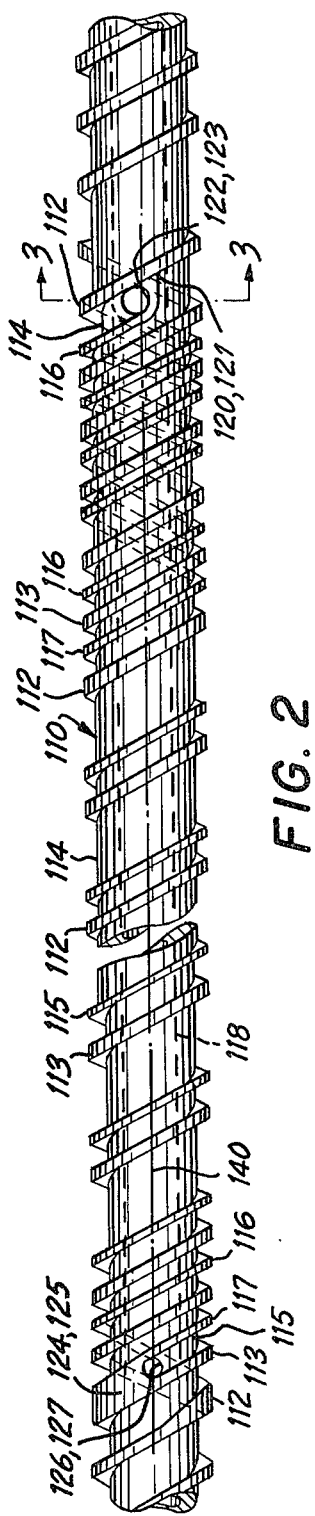
FIG. 2 is a fragmentary plan view of a screw conveyor of the type shown in FIG. 1.
Figure 3:
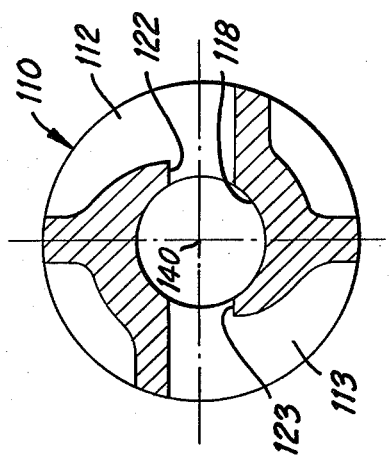
FIG. 3 is a lateral cross-sectional view taken along line 3—3 of FIG. 2.

Turning now to FIGS. 2 and 3, a screw conveyor constructed in accordance with the invention is shown at 110 and is seen to include primary flights 112 and 113, defining main channels 114 and 115 and secondary flights 116 and 117, establishing an extended flow circuit for the recycling of unmelted solids through a backfeed passage 118. In the illustrated arrangement, the secondary flights 116 and 117 intersect with corresponding primary flights 112 and 113 at both downstream locations 120 and 121, just downstream of drainage openings 122 and 123, and upstream locations 124 and 125, just upstream of melt-return apertures 126 and 127. The longitudinal distance between the secondary flights 116 and 117, and the primary flights 112 and 113 is varied along at least portions of the screw conveyor 110 to enable the accommodation of relatively more melted material and less unmelted solids as the flights proceed downstream. Unmelted solids are guided by each secondary flight 116 and 117 into the drainage openings 122 and 123 for recycling through backfeed passage 118 to be discharged as melt at the melt-return apertures 126 and 127. As described in connection with the apparatus of FIG. 1, a second screw conveyor is placed in the backfeed passage to facilitate the movement of drained material in an upstream direction.

The presence of unplasticated material in the portion of each channel 114 and 115 lying between each primary flight 112 and 113 and the corresponding secondary flights 116 and 117, establishes lateral forces tending to deflect screw conveyor 110 laterally; that is, transverse to longitudinal axis 140 of the screw conveyor. Should radial components of these forces become great enough in magnitude in a particular direction, sufficient deflection could occur to cause excessive vibration, wear, and even galling, of the screw conveyor as the screw conveyor rotates within the extruder. However, in screw conveyor 110, the radial components of the lateral forces are more-or-less balanced so as to minimize any resultant radial force upon the screw conveyor and any concomitant lateral deflection of the screw conveyor. The radial components of the lateral forces are substantially balanced by arranging the primary flights 112 and 113 in circumferentially spaced arrangement and the secondary flights 116 and 117 in circumferentially spaced arrangement about the longitudinal axis 140 of the new conveyor in such a way that the radial component forces will tend to cancel out, thereby leaving only a minimal, if any, resultant radial force tending to deflect the screw conveyor laterally. In the illustrated construction of screw conveyor 110, the arrangement of the flights 112, 113, 116 and 117 is such that portions of corresponding flights 112 and 116 are spaced circumferentially from corresponding portions of flights 113 and 117, respectively, such that flights 112 and 116 are located about longitudinal axis 140 symmetrically with respect to flights 113 and 117 so that forces established by solid material in portions of channel 114 are balanced substantially by forces established by solid material in portions of channel 115. In this instance, corresponding portions of flights 112 and 113 are spaced circumferentially from one another an angular distance of 180°, and corresponding portions of flights 116 and 117 are spaced circumferentially from one another an angular distance of 180°, as illustrated in FIGS. 2 and 3, so as to maintain symmetry about the longitudinal axis 140. Thus, the basically symmetrical double-flighted configuration of screw conveyor 110 attains the desired result of reducing, or even eliminating, unwanted lateral deflection of the screw conveyor. It will be apparent that other configurations are possible for providing a balance in the radial components of the aforesaid lateral forces. For example, a non-symmetrical arrangement of multiple flights can attain the desired balance as long as the arrangement is constructed so as to reduce the resultant radial force to an accepted minimum. Thus, by placing the corresponding portions of the primary flights 112 and 113 in opposed relationship to one another, that is, located opposite one another, relative to the longitudinal axis 140, and by placing the corresponding portions of the secondary flights 116 and 117 in opposed relationship, that is, located opposite one another, relative to longitudinal axis 140, as illustrated, the desired balance of forces is attained.

The desired balance of forces further is achieved in screw conveyor 110 by locating the drainage openings 122 and 123 diametrically opposite one another, to preserve the symmetrical arrangement, as seen in FIG. 3. Likewise, melt-return apertures 126 and 127 are located symmetrically about the longitudinal axis 140 by placement in diametrically opposed relationship.

Figure 4:
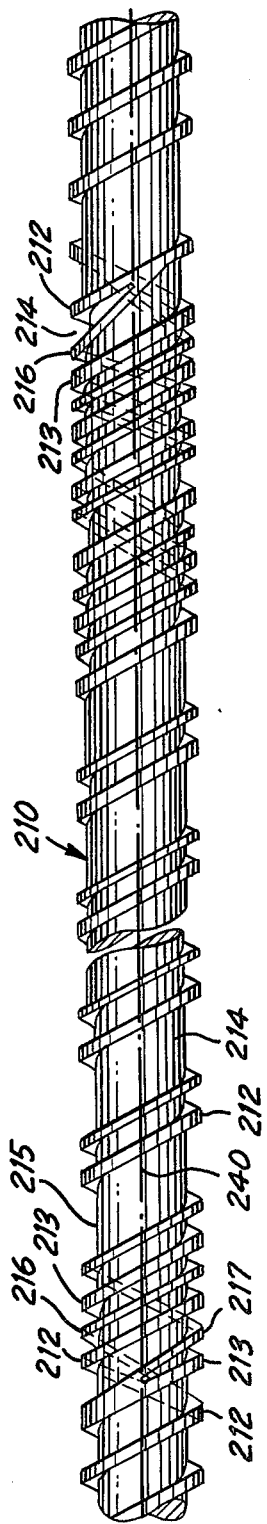
FIG. 4 is a fragmentary plan view of another screw conveyor embodying the present invention.

Turning now to FIG. 4, another screw conveyor 210 is illustrated in which there is attained a substantial balance of radial component forces for the purpose of reducing to a minimum unwanted lateral deflection of the screw conveyor.

Screw conveyor 210 includes primary flights 212 and 213, defining channels 214 and 215, and secondary flights 216 and 217 which serve to segregate already plasticated material from unplasticated material in each channel 214 and 215. Here again, the presence of unplasticated material in the portion of each channel 214 and 215 lying between each primary flight 212 and 213 and the corresponding secondary flights 216 and 217 establishes lateral forces tending to deflect screw conveyor 210 laterally relative to longitudinal axis 240 of the screw conveyor. However, the radial components of the lateral forces substantially are balanced by arranging all of the flights about the longitudinal axis in such a way that the radial components will tend to cancel one another to produce only a minimal, if any, resultant radial force tending to deflect the screw conveyor laterally. Again, the illustrated construction includes like flights and like channels arranged in opposed relationship and symetrically relative to one another about the longitudinal axis of the screw conveyor; however, non-symmetrical arrangements of multiple flights are possible as long as the end result is a substantial balance of radial component forces to reduce any resultant radial force to an acceptable minimum.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for use in a plasticating extruder of the type having a longitudinally extending elongate barrel for preparing a plasticated material from solids introduced into the extruder, said apparatus comprising:

a first screw conveyor for placement in the barrel, said first screw conveyor including a longitudinal axis and at least two primary flights, each primary flight defining a channel for continuously conveying the material in a downstream direction as the material is melted within the channel, each said primary flight having a leading face facing downstream and a trailing face facing upstream, each said channel extending between the leading face and the trailing face of a corresponding flight;

a backfeed passage within the first screw conveyor, said backfeed passage communicating with each channel at a downstream location and at an upstream location in that channel to establish an extended flow circuit along which the material will move through each channel and the backfeed passage, each downstream location being in position to receive at least some unplasticated material from the corresponding channel, and each upstream location being spaced axially upstream of the downstream location a distance sufficient to enable plastication within the backfeed passage of at least some of the unplasticated material admitted to the backfeed passage;

a second screw conveyor located in said backfeed passage and arranged to convey material from each downstream location to each upstream location so as to enable recirculation of material along the extended flow circuit through the backfeed passage;

at least two secondary flights on the first screw conveyor, each secondary flight being associated with one of said primary flights for directing unplasticated material into the backfeed passage and segregating the already plasticated material from the unplasticated material in the corresponding channel;

at least two drainage openings, each drainage opening interconnecting one of said channels and the backfeed passage at the corresponding downstream location for enabling the flow of unplasticated material from each channel into the backfeed passage at the corresponding location; and at least two melt-return apertures, each melt-return aperture interconnecting the backfeed passage and one of each of said channels at the corresponding upstream location for enabling the flow of plasticated material from the backfeed passage to each channel at the corresponding upstream location;

the primary flights each being spaced circumferentially from one another and the secondary flights each being spaced circumferentially from one another so as to locate the primary flights opposite one another and the secondary flights opposite one another about the longitudinal axis of the screw conveyor, with corresponding portions of the primary flights in opposed relationship with one another and corresponding portions of the secondary flights in opposed relationship with one another, relative to said longitudinal axis, such that radial components of forces between the first screw conveyor and the unplasticated material located in each channel between each primary flight and the corresponding secondary flight will substantially be balanced to reduce to a minimum any resultant radial force upon the first screw conveyor and any concomitant lateral deflection of the first screw conveyor.

2. The invention of claim 1 wherein the circumferential spacing between corresponding portions of the primary flights and the circumferential spacing between corresponding portions of the secondary flights is such that the respective primary flights and the respective secondary flights are arranged symmetrically relative to one another about the longitudinal axis of the first screw conveyor.

3. The invention of claim 1 or 2 wherein the drainage openings are spaced circumferentially from one another so as to be located about the longitudinal axis of the first screw conveyor such that radial components of forces exerted upon the first screw conveyor at the drainage openings will substantially be balanced to reduce to a minimum any resultant radial force upon the first screw conveyor and any concomitant lateral deflection of the first screw conveyor.

4. The invention of claim 3 wherein the circumferential spacing between the drainage openings is such that the drainage openings are located substantially symmetrically about the longitudinal axis of the first screw conveyor.

5. The invention of claim 1 or 2 wherein the melt-return apertures are spaced circumferentially from one another so as to be located about the longitudinal axis of the first screw conveyor such that radial components of forces exerted upon the first screw conveyor at the melt-return apertures will substantially be balanced to reduce to a minimum any resultant radial force upon the first screw conveyor and any concomitant lateral deflection of the first screw conveyor.

6. The invention of claim 5 wherein the circumferential spacing between the melt-return apertures is such that the melt-return apertures are located substantially symmetrically about the longitudinal axis of the first screw conveyor.

7. The invention of claim 6 wherein the circumferential spacing between the drainage openings is such that the drainage openings are located substantially symmetrically about the longitudinal axis of the first screw conveyor.

8. The invention of claim 7 wherein the longitudinal distance between each secondary flight and a corresponding primary flight is varied along at least a portion of the first screw conveyor.

9. The invention of claim 1 or 2 wherein the longitudinal distance between each secondary flight and a corresponding primary flight is varied along at least a portion of the first screw conveyor.

10. Apparatus for use in a plasticating extruder of the type having an elongate barrel for preparing a plasticated material from solids introduced into the extruder, said apparatus comprising:
   a screw conveyor for placement in the barrel, said screw conveyor including a longitudinal axis and at least two primary flights, each primary flight defining a channel for continuously conveying the material in a downstream direction as the material is melted within the channel, each said flight having a leading face facing downstream and a trailing face facing upstream, each said channel extending between the leading face and the trailing face;
   at least two secondary flights on the screw conveyor, each secondary flight being associated with one of said primary flights for segregating the already plasticated material from unplasticated material in the corresponding channel;
   the primary flights each being spaced circumferentially from one another and the secondary flights each being spaced circumferentially from one another so as to locate the primary flights opposite one another and the secondary flights opposite one another about the longitudinal axis of the screw conveyor, with corresponding portions of the primary flights in opposed relationship with one another and corresponding portions of the secondary flights in opposed relationship with one another, relative to said longitudinal axis, such that radial components of forces between the screw conveyor and the unplasticated material located in each channel between each primary flight and the corresponding secondary flight will substantially be balanced to reduce to a minimum any resultant radial force upon the screw conveyor and any concomitant lateral deflection of the screw conveyor.

11. The invention of claim 10 wherein the circumferential spacing between corresponding portions of the primary flights and the circumferential spacing between corresponding portions of the secondary flights is such that the respective primary flights and the respective secondary flights are arranged symmetrically relative to one another about the longitudinal axis of the screw conveyor.

12. The invention of claim 10 or 11 wherein the longitudinal distance between each secondary flight and a corresponding primary flight is varied along at least a portion of the screw conveyor.

* * * * *